(12) United States Patent
Mistlbauer

(10) Patent No.: US 8,651,966 B2
(45) Date of Patent: Feb. 18, 2014

(54) COUPLING APPARATUS WITH TWO COUPLINGS

(75) Inventor: Walter Mistlbauer, Pöchlam (AT)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 13/554,140

(22) Filed: Jul. 20, 2012

(65) Prior Publication Data

US 2013/0180818 A1 Jul. 18, 2013

Related U.S. Application Data

(63) Continuation of application No. PCT/EP2010/006763, filed on Nov. 6, 2010.

(30) Foreign Application Priority Data

Jan. 20, 2010 (DE) .......................... 10 2010 005 255

(51) Int. Cl.
*F16D 3/50* (2006.01)
(52) U.S. Cl.
USPC .......................................... 464/85; 29/525.11
(58) Field of Classification Search
USPC .......................... 464/68.91, 83, 85; 29/525.11
See application file for complete search history.

(56) References Cited

U.S. PATENT DOCUMENTS

| | | | |
|---|---|---|---|
| 3,505,832 A | 4/1970 | Braithwaite | |
| 4,743,213 A | 5/1988 | Aubrey et al. | |
| 4,743,218 A | 5/1988 | Aubrey et al. | |
| 5,228,664 A | 7/1993 | Moulinet | |
| 5,573,460 A | 11/1996 | Toji | |
| 6,358,154 B1 * | 3/2002 | Murrell et al. | |

FOREIGN PATENT DOCUMENTS

| | | | |
|---|---|---|---|
| DE | 8815979 | 12/1988 | |
| DE | 38 43 496 C1 | 4/1990 | |
| DE | 39 06 201 C2 | 1/1995 | |
| DE | 103 46 253 A1 | 5/2005 | |
| EP | 0 698 540 A1 | 8/1995 | |
| FR | 1.198.842 * | 12/1959 | ...................... 464/83 |
| GB | 377454 * | 7/1932 | ...................... 464/85 |

OTHER PUBLICATIONS

Translation of the International Preliminary Report on Patentability for International Application No. PCT/EP2010/006763 filed Nov. 6, 2010 (7 pages).
International Search Report dated Feb. 15, 2011 for International Application No. PCT/EP2010/006763 (9 pages).

* cited by examiner

*Primary Examiner* — Gregory Binda
(74) *Attorney, Agent, or Firm* — Taylor IP, P.C.

(57) ABSTRACT

A coupling apparatus for transmitting torque from a drive shaft to an output shaft includes two couplings with a respective primary part and secondary part. The primary and secondary parts are twistable to a certain extent relative to one another against the force of springs. Several carriers for carrying spring plates and support plates are arranged in a distributed manner over the circumference of the coupling. There is a locating pin between two screws for positioning a carrier, the locating pin being axially parallel to the screws. One coupling is in a drive connection with the drive shaft, and the other coupling is in a drive connection with the output shaft. Every carrier which can be inserted into a respective recess in the primary part or secondary part of the respective coupling forms a premounted spring unit together with the spring plates carried by the carrier.

6 Claims, 3 Drawing Sheets

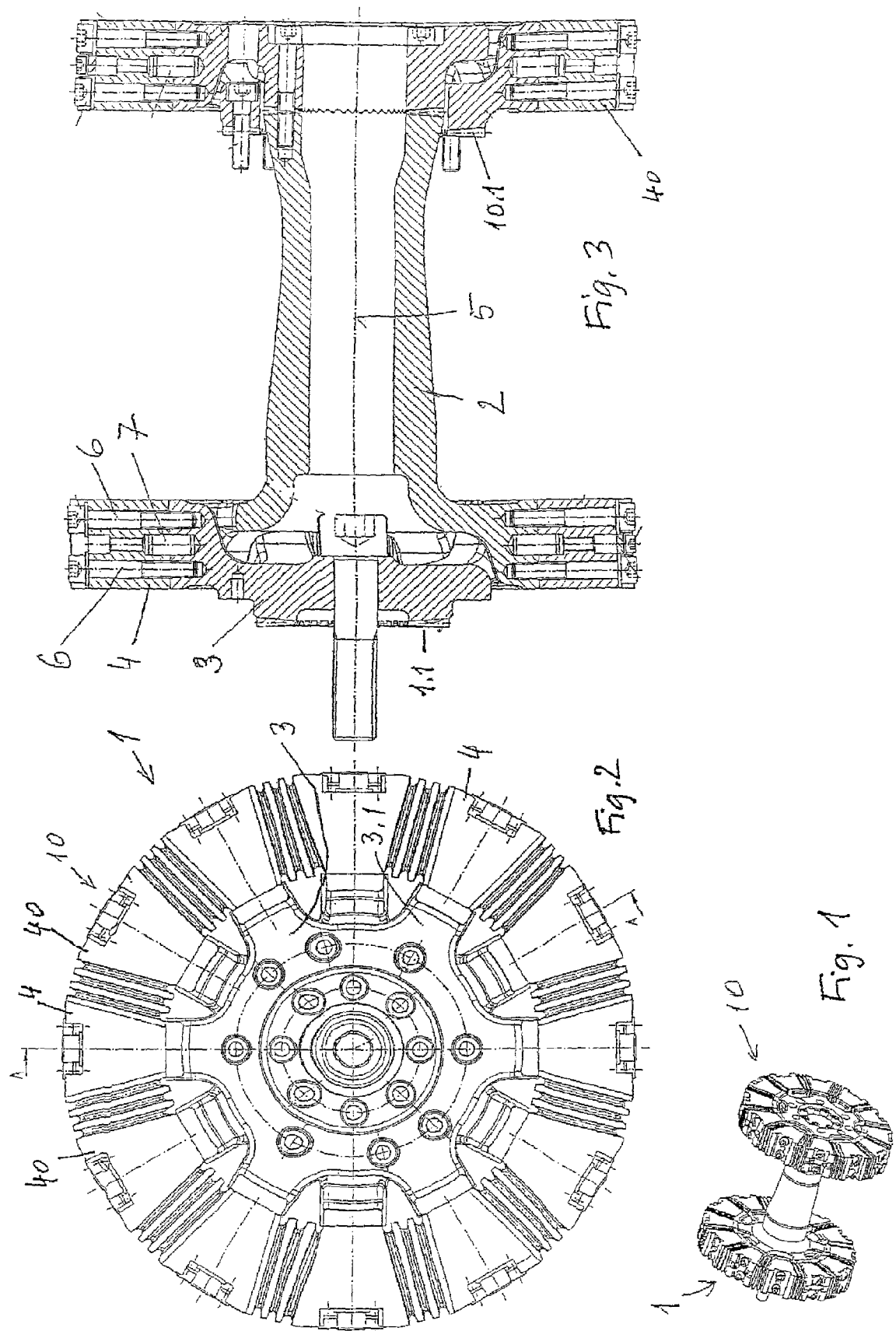

COUPLING APPARATUS WITH TWO COUPLINGS

CROSS REFERENCE TO RELATED APPLICATIONS

This is a continuation of PCT application No. PCT/EP2010/006763, entitled "ELASTIC COUPLING", filed Nov. 6, 2010, which is incorporated herein by reference.

BACKGROUND OF THE INVENTION

1. Field of the Invention

The invention relates to a coupling apparatus for transmitting a torque from a drive shaft to an output shaft. The coupling apparatus comprises two couplings, respectively comprising a primary part and a secondary part. The primary part and secondary part can be twisted relative to one another to a limited extent against the force of springs.

2. Description of the Related Art

Such couplings are known in numerous embodiments. DE 39 06 201 C1 describes a torsionally elastic coupling with spring elements, consisting of elastic bodies made of rubber for example. Support plates are arranged between the spring elements.

U.S. Pat. No. 5,573,460 describes an elastic coupling in disk configuration with two coupling halves. Damping chambers are disposed in the radially outer region of the coupling, which damping chambers can be filled with a damping medium. Such couplings are used as torsional vibration dampers in the drive train of motor vehicles.

U.S. Pat. No. 3,505,832A is especially relevant. An elastic coupling with a primary part and a secondary part is known from this specification. Support plates are arranged between the spring plates, respectively carried by carriers.

Couplings of the kind mentioned above are mass-produced articles which are used especially in the construction of vehicles. The production costs play a considerable role, as also the weight and the overall volume. These criteria are not fulfilled by the known couplings to the extent as is desired.

The present invention is therefore based on the object of providing, and what is needed in the art is to provide, a coupling apparatus with two couplings which offers low weight and low overall size.

SUMMARY OF THE INVENTION

This object is achieved by, and the present invention provides, a coupling apparatus for transmitting a torque from a drive shaft to an output shaft, including the following features:

1.1 two couplings are provided;
1.2 with a respective primary part and secondary part;
1.3 the primary part and the secondary part are twistable to a certain extent relative to one another against the force of springs;
1.4 the springs comprise plate-shaped spring plates made of rubber-elastic material;
1.5 support plates are arranged between the spring plates;
1.6 several carriers for carrying the spring plates and the support plates are arranged in a distributed manner over the circumference of the coupling;
1.7 when seen in a top view of the coupling axis, every carrier has the contour of a wedge which tapers radially inwardly;
1.8 a packet of spring plates and support plates which alternate with one another is disposed on either side of each carrier adjacent to the two wedge surfaces of the carrier;
1.9 the support plates which are the outer ones as seen in the circumferential direction comprise a guide strip or a guide groove, which cooperate with a respective guide strip or guide groove of the outer support plates of the other coupling part;
1.10 the secondary part of the first coupling is in drive connection via a spacer shaft with the primary part of the second coupling;
1.11 as seen in the direction of the coupling axis, every coupling comprises a star-shaped base body;
1.12 the base body comprises a plurality of projections extending radially to the outside;
1.13 every projection carries a carrier;
1.14 every carrier is fixed to the associated projection by means of two screws, characterized by the following features:
1.15 there is a locating pin between the two screws for positioning the carrier, which locating pin is axially parallel with respect to the screws;
1.16 the one of the two couplings is in a drive connection with the drive shaft, and the other of the two couplings is in a drive connection with the output shaft;
1.17 every carrier which can be inserted into a respective recess in the primary part or secondary part of the respective coupling forms a premounted spring unit together with the spring plates carried by said carrier.

The coupling apparatus in accordance with the invention is based on two mutually cooperating couplings. Each coupling comprises plate-like springs (spring plates) made of a rubber-elastic material, supported by several carriers which are arranged in a distributed manner over the circumference of the coupling.

The relevant features of the invention are the following:
When seen in a top view of the coupling axis, each carrier has the contour of a wedge which tapers radially inwardly.
Each carrier carries a number of plate springs on its two wedge surfaces.
Each carrier forms a premounted structural spring unit together with the spring plates carried by them.

This leads to the following advantages:
The individual spring unit is produced in such a way that a spring plate is applied to each wedge surface by means of vulcanization for example. A sheet metal plate is applied to the applied spring plate, and thereafter a spring plate to the sheet metal plate, so that spring plates and sheet metal plates alternate with one another. The entire spring unit will then be pretensioned. It can now be inserted into a respective recess in the primary part or secondary part of the coupling. Pressure is exerted on the spring unit in the radial direction from the outside, e.g. in such a way that a tension bolt is inserted from the outside into the wedge-like carrier and is screwed together in the flange of the primary part or secondary part, so that tightening of the entire spring unit will occur.

The advantages obtained from the invention can be summarized as follows:
No special mounting apparatuses are required for mounting the spring unit on the primary part or secondary part. Rather, the spring units can be mounted with conventional tools. This reduces the mounting costs and thereby the production costs.
The spring units are easily exchangeable even when the drive has been installed.
The weight of the spring unit and therefore the weight of the entire coupling are low as a result of the simple and compact configuration.

A spring unit acts in operation in both directions of rotation.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 1 shows a perspective view of a coupling apparatus with the features of the invention;

FIG. 2 shows an enlarged view of the coupling apparatus according to FIG. 1 with a view on a face side;

FIG. 3 shows a view of the item of FIG. 2 according to the line of intersection A-A;

Corresponding reference characters indicate corresponding parts throughout the several views. The exemplifications set out herein illustrate one embodiment of the invention, and such exemplifications are not to be construed as limiting the scope of the invention in any manner.

DETAILED DESCRIPTION OF THE INVENTION

Figure 4:
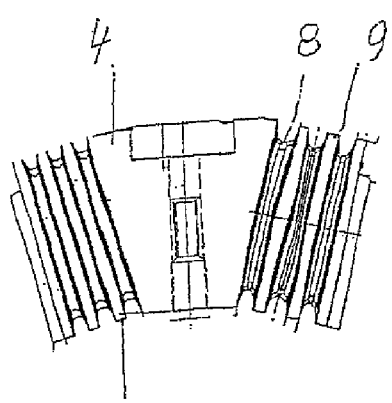
FIG. 4 shows a spring element in a side view.

The coupling apparatus shown in FIG. 1 comprises two disk-like couplings 1, 10. They are arranged in a substantially similar or even identical manner. The coupling shown on the left in FIG. 1 is associated with the drive axle shaft (not shown), and the coupling shown on the right in the drawing is associated with the transmission output shaft, which is also not shown. The coupling apparatus according to FIG. 1 assumes the function of a universal joint shaft. A torque can be transmitted thereby from the drive axle shaft onto the transmission output shaft which is not in alignment with the same.

FIG. 3 shows a hollow cardan shaft 2 which connects the two couplings 1 and 10 with each other.

Coupling 1 carries a serration 1.1 for transmitting torque from the drive axle shaft to the coupling 1. Coupling 10 carries serration 10.1 for transmitting torque from the coupling 10 to the transmission output shaft.

The configuration of the couplings shall be described in closer detail by reference to coupling 1. Coupling 1 comprises a star-shaped base body 3. It comprises six projections 3.1 which extend radially to the outside. Every projection carries a very decisive component, which is a carrier 4. The carrier 4 is wedge-shaped (see FIG. 2). It tapers towards the rotational axis 5 of the apparatus.

Every carrier 4 is fixed to a projection 3.1 of the base body 3 by means of screws 6. A straight pin 7 for positioning the carrier 4 is disposed between the two screws 6, 6.

FIG. 2 shows that the two couplings 1, 10 are arranged in a substantially similar way. A wedge-shaped carrier 4 of the coupling 1 is disposed between two adjacent wedge-shaped carriers 40, 40 of the coupling 10.

A packet of spring plates 8 and support plates 9 is fastened to the two wedge surfaces of each carrier 4, 40. They are arranged in an alternating fashion. The spring plates are respectively vulcanized at first onto the respective wedge surface of the carrier 4, and thereafter onto the respective surface of the following support plate 9. The support plates 9 can be made of sheet steel. It is also possible to produce the support plates from another material.

The apparatus according to FIGS. 1 to 3 is provided for the drive of rail vehicles. The coupling apparatus is used for compensating torsional vibrations between the drive axle and the pivoted bogey. The coupling apparatus will be installed in the pivoted bogey. The components in accordance with the invention compensate the spring excursion of the primary spring in a cardanic fashion. The rubber layers in the spring units will be displaced in the axial direction.

Figure 5:
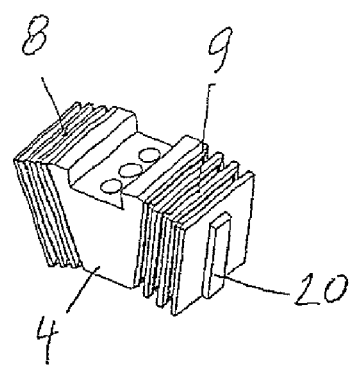
FIG. 5 shows the spring element according to FIG. 4 in a perspective view.

The packet of spring plates and support plates as shown in FIG. 4 on the right is non-tensioned, whereas the packet on the left is tensioned (also see FIG. 5).

FIG. 5 shows three mutually aligned boreholes, which is a middle borehole for the aforementioned straight pin 7 which is used as a locating pin, and the two adjacent boreholes for one respective fastening screw 6.

FIG. 5 further shows a guide strip 20. It is provided in the spring units of the one coupling at its respective two ends, i.e. on the two outer support plates 9. The spring plates 8 must be pretensioned in the mounted state so as to avoid from being lifted off as a result of the drive torque. The pretensioning will be achieved automatically by mounting the wedge-shaped carriers.

Mounting can be pursued in two different ways:

The spring packets formed by the spring plates 8 and the support plates 9 can be inserted into the intermediate space between two mutually adjacent projections 3.1, 3.1. The wedge-shaped carrier 4 can then be inserted between the spring packets and be tightened.

Alternatively, the spring unit consisting of the carrier 4 and the spring plates 8 and the support plates 9 can be joined in advance into a single unit and can then be inserted, followed by screwing the relevant carrier 4 to the projection 3.

The straight pin 7 is guided through the wedge-shaped carrier 4 and introduced into the respective projection 3.1. It ensures the position of the components.

Brackets can additionally be provided which are fixed to the carriers 4 by means of screws and which reach beyond the spring packets consisting of the spring plates 8 and the support plates 9. It is thereby ensured that the spring packets will not slide radially to the outside during operation.

The production of the coupling in accordance with the invention is very simple. The relevant parts of the spring unit, especially the wedge-shaped carriers 4, can be made of aluminum in order to reduce the weight of coupling.

The following sequence of mounting the elastic coupling in accordance with the invention is advantageous:

The straight pin 7 is inserted into the carrier 4 at first.

The unit consisting of the carrier 4, the spring plates 8 and the support plates 9 will then be mounted on the base body 3.

Figure 6:
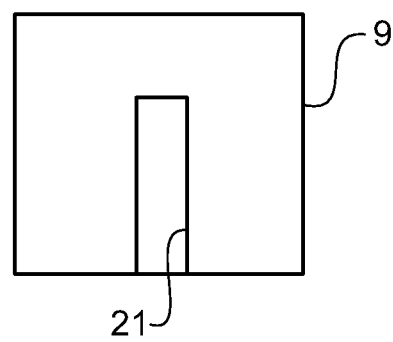
FIG. 6 schematically shows a support plate.

It is ensured in this manner that each one of the guide strips 20 will be disposed in its correct position and will engage smoothly in the associated groove 21. If mounting is performed in reverse order, the guide strips 20 would need to be readjusted during mounting. FIG. 6 schematically shows support plate 9 with a guide groove 21.

It is understood that pin 7 need not necessarily be cylindrical, but can have any other cross section.

The coupling apparatus includes two couplings 1, 10 including respectively a primary part and a secondary part. The primary part and the secondary part are twistable to a certain extent relative to one another against a force of the plurality of springs, the secondary part of the first coupling 1 being in a drive connection via the spacer shaft 2 with the primary part of the second coupling 10, the plurality of springs including a plurality of spring plates 8 made of rubber-elastic. One of the two couplings 1, 10 is in a drive connection with the drive shaft, and another of the two couplings 1, 10 is in a drive connection with the output shaft. The primary part or the secondary part includes a recess, each of the plurality of carriers 4 which can be inserted into a respective recess in the primary part or the secondary part of a respective one of the two couplings 1, 10 forming a premounted spring unit together with the plurality of spring plates 8 carried by a respective one of the plurality of carriers 4.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A coupling apparatus for transmitting a torque from a drive shaft to an output shaft, said coupling apparatus comprising:

a spacer shaft;

two couplings each including a primary part and a secondary part, said two couplings including a plurality of springs, a first coupling, a second coupling, a plurality of support plates, a plurality of carriers, two screws, and a locating pin, said primary part and said secondary part being twistable to a certain extent relative to one another against a force of said plurality of springs, said secondary part of said first coupling being in a drive connection via said spacer shaft with said primary part of said second coupling, said plurality of springs including a plurality of spring plates made of rubber-elastic material, said plurality of support plates being arranged between said plurality of spring plates, said plurality of carriers being for carrying said plurality of spring plates and said plurality of support plates and being arranged in a distributed manner over a circumference of a respective one of said two couplings, when seen in a top view of a coupling axis of the coupling apparatus each of said plurality of carriers has a contour of a wedge which tapers radially inwardly, each of said plurality of carriers including two wedge surfaces, said plurality of spring plates and said plurality of support plates forming at least one packet of said plurality of spring plates and plurality of support plates which alternate with one another, said packet of said plurality of spring plates and said plurality of support plates which alternate with one another being disposed on either side of each of said plurality of carriers adjacent to said two wedge surfaces, said plurality of support plates including a plurality of outer support plates which are outer ones of said plurality of support plates and said plurality of spring plates as seen in a circumferential direction, said plurality of outer support plates of one coupling part including one of a guide strip and a guide groove which cooperate with a respective one of a guide strip and a guide groove of said plurality of outer support plates of another coupling part, as seen in a direction of said coupling axis each of said two couplings includes a star-shaped base body, said star-shaped base body including a plurality of projections extending radially to an outside, each of said plurality of projections carrying respectively one of said plurality of carriers, each of said plurality of carriers being fixed to an associated one of said plurality of projections by way of said two screws, said locating pin being between said two screws for positioning a respective one of said plurality of carriers, said locating pin being axially parallel with respect to said two screws, one of said two couplings being in a drive connection with the drive shaft and another of said two couplings being in a drive connection with the output shaft, one of said primary part and said secondary part including a recess, each of said plurality of carriers which can be inserted into a respective said recess in one of said primary part and said secondary part of a respective one of said two couplings forming a premounted spring unit together with said plurality of spring plates carried by said respective one of said plurality of carriers.

2. The coupling apparatus according to claim 1, wherein each of said plurality of support plates includes a surface, said plurality of spring plates being respectively vulcanized onto a respective one of said two wedge surfaces of said respective one of said plurality of carriers and onto a respective said surface of a following one of said plurality of support plates.

3. The coupling apparatus according to claim 1, further including a plurality of said packet, said plurality of outer support plates of one said coupling part including one of said guide strip and said guide groove which cooperate with a respective one of said guide strip and said guide groove of said plurality of outer support plates of said plurality of packets of said other coupling part.

4. The coupling apparatus according to claim 1, wherein said locating pin is guided through said respective one of said plurality of carriers and is introduced into a respective one of said plurality of projections.

5. The coupling apparatus according to claim 1, further including a plurality of said packet.

6. The method for mounting a coupling apparatus for transmitting a torque from a drive shaft to an output shaft, said method comprising the steps of:

providing:

a spacer shaft; and two couplings each including a primary part and a secondary part, said two couplings including a plurality of springs, a first coupling, a second coupling, a plurality of support plates, a plurality of carriers, two screws, and a locating pin, said primary part and said secondary part being twistable to a certain extent relative to one another against a force of said plurality of springs, said secondary part of said first coupling being in a drive connection via said spacer shaft with said primary part of said second coupling, said plurality of springs including a plurality of spring plates made of rubber-elastic material, said plurality of support plates being arranged between said plurality of spring plates, said plurality of carriers being for carrying said plurality of spring plates and said plurality of support plates and being arranged in a distributed manner over a circumference of a respective one of said two couplings, when seen in a top view of a coupling axis of the coupling apparatus each of said plurality of carriers has a contour of a wedge which tapers radially inwardly, each of said plurality of carriers including two wedge surfaces, said plurality of spring plates and said plurality of support plates forming at least one packet of said plurality of spring plates and said plurality of support plates which alternate with one another, said packet of said plurality of spring plates and said plurality of support plates which alternate with one another being disposed on either side of each of said plurality of carriers adjacent to said two wedge surfaces, said plurality of support plates including a plurality of outer support plates which are outer ones of said plurality of support plates and said plurality of spring plates as seen in a circumferential direction, said plurality of outer support plates of one coupling part including one of a guide strip and a guide groove which cooperate with a respective one of a guide strip and a guide groove of said plurality of outer support plates of another coupling part, as seen in a direction of said coupling axis each of said two couplings includes a star-shaped base body, said star-shaped base body including a plurality of projections extending radially to an outside, each of said plurality of projections carrying respectively one of said plurality of carriers, each of said plurality of carriers being fixed to an associated one of said plurality of projections by way of said two screws, said locating pin being between said two screws for positioning a respective one of said plurality of carriers, said locating pin being axially parallel with respect to said two screws, one of said two couplings being in a drive connection with the drive shaft and another of said two couplings being in a drive connection with the output shaft, one of said primary part and said secondary part including a recess, each of said plurality of carriers which can be inserted into a respective said recess in one of said primary part and said secondary part of a respective one of said two couplings forming a premounted spring unit together with said plurality of spring plates carried by said respective one of said plurality of carriers;

guiding said locating pin through said respective one of said plurality of carriers and inserting said locating pin into a respective one of said plurality of projections; and mounting on said star-shaped base body of one of said primary part and said secondary part said spring unit including said respective one of said plurality of carriers, respective ones of said plurality of spring plates, and respective ones of said plurality of support plates.

\* \* \* \* \*